United States Patent [19]

Gusmer

[11] Patent Number: 5,038,448
[45] Date of Patent: Aug. 13, 1991

[54] FIBER ROLL WITH POLYESTER FIBER FILLER

[75] Inventor: John H. Gusmer, Waupaca, Wis.

[73] Assignee: A. Gusmer, Inc., Cranford, N.J.

[21] Appl. No.: 413,864

[22] Filed: Sep. 28, 1989

[51] Int. Cl.⁵ .............................................. B21B 31/08
[52] U.S. Cl. ..................... 29/125; 29/129.5; 29/132
[58] Field of Search ............ 29/125, 132, 129.5, 29/139; 162/146

[56] References Cited

U.S. PATENT DOCUMENTS

| | | | |
|---|---|---|---|
| 578,543 | 3/1897 | Butterworth | 29/132 |
| 843,700 | 2/1990 | Rusden | 29/132 |
| 1,785,265 | 12/1930 | Lade | 29/132 |
| 3,291,039 | 12/1966 | Christie | 29/132 |
| 3,383,749 | 5/1968 | Wilkinson | 29/132 |
| 3,853,677 | 12/1974 | Kai | 29/132 |
| 4,283,821 | 8/1981 | Paakkunainen | 29/132 |
| 4,669,163 | 7/1987 | Lux et al. | 29/125 |

Primary Examiner—Irene Cuda
Attorney, Agent, or Firm—Fitch, Even, Tabin & Flannery

[57] ABSTRACT

An elastic fiber roll for use in embossers and super calenders has a cylindrical body supported on its cylindrical axis for rotation. The cylindrical body is formed from a plurality of compacted disk elements of a non-woven-randomly laid, entangled mixture of fibers. The mixture of fibers includes from about 20% to about 75% polyester fibers and from about 80% to about 25% of cellulose fibers. The fiber roll is prepared by a process which includes the steps of: (a) forming an integrated nonwoven web from a mixture of cellulose fibers and polyester fibers; (b) cutting annular segments from the nonwoven web; (c) stacking a plurality of segments onto a rotatable shaft; (d) compacting the plurality of segments on the shaft to form a fiber roll; and (e) dressing the sides of the compacted disks to form a smooth cylindrical surface.

10 Claims, 1 Drawing Sheet

FIBER ROLL WITH POLYESTER FIBER FILLER

FIELD OF THE INVENTION

The present invention relates to rolls made of compacted sheets of fibers and to a method of making the same. More particularly, the present invention relates to a method for producing a fiber roll, which roll comprises a shaft portion and a cover portion made of fiber material, wherein the cover portion is made by compressing in an axial direction of the roll a plurality of annular fiber sheets fitted along the shaft portion. The fiber rolls of the invention are particularly useful for super calenders and embossers in the paper industry, and are also useful in the textile industry for glazing calenders and are useful in the plastic industry. Particularly, the present invention is directed to a fiber roll made from fiber sheets which are produced from an integrated nonwoven web of randomly laid entangled fibers which are a mixture of cellulose fibers and polyester fibers.

BACKGROUND OF THE INVENTION

Paper appearing at the output of a paper machine has a relatively rough surface and usually requires further processing to level and compress the surface. Additional processing is generally accomplished by calenders and super calenders. Calenders are a set pair of hard metal rolls which level the peripheral surfaces of the paper so that parts of the paper forming the outer surface lie essentially in one plane. Super calenders are a pair of rolls wherein one of the pair is a hard metal roll which is paired with an elastically yielding roll. The elastic roll is super calenders is usually in the form of a great number of paper sheets fitted on a shaft and compressed in an axial direction of the shaft. Super calenders compress the paper web and close pores in the web's outer surface so as to smooth an add luster to the paper.

A principal requirement for the elastic roll for a super calender or embosser is a degree of resilience. A simple test for indicating the resilience of an elastic super calender roll is to indent a pair of rolls by passing a sheet of cardboard through the nip and then measuring the mark of indentation after successive conditioning cycles. It would be highly desirable to provide an elastic roll that can heal rapidly from any sign of the indentation. The rolls of this invention were completely healed after only three conditioning cycles. A conditioning cycle involves running the roll at a speed of 152 m/minute (500 ft minute) and at a linear pressure of 350 KN/m (2000 pli). 90 ml (3 oz.) of water is applied to the ingoing nip and the roll is allowed to run for a period of 5 minutes. The roll is then stopped for inspection and analysis.

U.S. Pat. No. 3,707,752 to Brafford et al. discloses a roll which is manufactured by winding a continuous strip of a mat of acrylic fibers, polyester fibers or mixtures of these fibers which have been saturated with epoxy resin. A plurality of layers of the mat are built up onto the roll.

U.S. Pat. No. 4,669,163 to Lux et al. is directed to a fiber roll manufactured by stacking a plurality of polyolefin segments into a pile and compacting the pile while restraining the pile in its compacted configuration.

U.S. Pat. No. 2,801,461 to Kusters discloses a roll made of a plurality of flat, angular, axially compressed disks mounted and restrained under compression on a support shaft. The disks are composed of nonwoven fibers bonded with vulcanized latexes. The fibers include tensilized nylon and natural fibers such as ramie, cotton, sisal-hemp.

U.S. Pat. No. 3,853,677 to Kai discloses a fiber roll made from axially compressed disks of a nonwoven fabric formed from a mixture of cotton or wool fibers and a mixture of fiber yarns such as polyester, nylon and rayon wherein the fibers are bonded with a resinous material. The fiber roll has a high Poisson's ratio.

SUMMARY OF THE INVENTION

The present invention provides a fiber roll that is resilient and is particularly adapted for providing an elastic roll for use in embossers and super calenders. The fiber roll of the present invention includes a cylindrical body supported on its cylindrical axis for rotation. The cylindrical body is formed from a plurality of compacted disk elements of a nonwoven-randomly laid, entangled mixture of fibers. The mixture of fibers includes from about 20% to about 75% polyester fibers and from about 80% to about 25% of cellulose fibers. The fiber roll of the invention is prepared by a process which includes the steps of: (a) forming an integrated nonwoven web from a mixture of cellulose fibers and polyester fibers; (b) cutting annular segments from the nonwoven web; (c) stacking a plurality of segments onto a rotatable shaft; (d) compacting the plurality of segments on the shaft to form a fiber roll; and (e) dressing the sides of the compacted disks to form a smooth cylindrical surface.

DETAILED DESCRIPTION OF THE INVENTION

Figure 1:
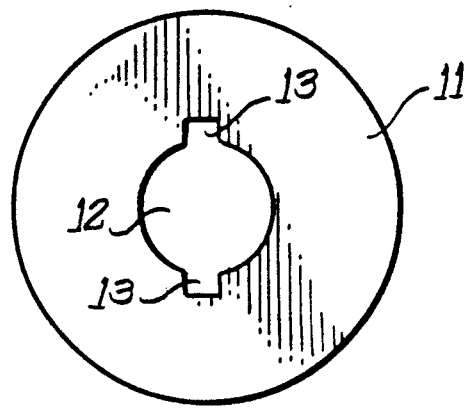
FIG. 1 shows an annular fiber material sheet used for producing a fiber roll.
Figure 2:
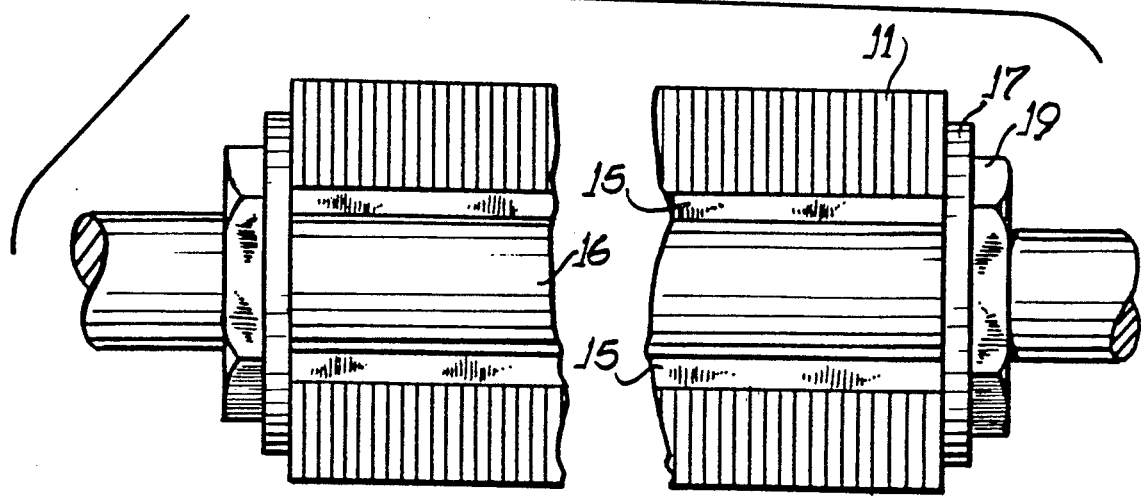
FIG. 2 shows an axial, partially broken away view of a fiber roll produced from the annular fiber material sheets of FIG. 1.

Referring now to the drawings, a plurality of annular fiber sheets 11, such as shown in FIG. 1 are cut from a nonwoven web of a randomly laid, entangled mixture of cellulose fibers and polyester fibers. The sheets 11 are an annulus having a center opening 12 which may have slots 13 to fit over one or more key elements 15 on a support shaft 16. The sheets 11 are stacked onto the support shaft and are compacted on the support shaft to form a fiber roll. The compaction is accomplished by the use of a hydraulic press or other suitable compaction force. The compacted sheets 11 are retained in place by placing flange rings 17 onto the shaft and tightening locking nuts 19 to generate axial compression. The roll of fiber sheets has a relatively low Poisson's ratio.

The fiber sheets of the invention are produced from an integrated nonwoven web of a randomly laid, entangled mixture of cellulose fibers and polyester fibers. The polyester fibers are present in the web at a level of from about 20% to about 75%, preferably 40% to 60%, by weight, dry basis, with the balance being cellulose fibers. The finished fiber sheets have a thickness of from about 0.02 inch to about 0.2 inch and have a moisture content of from about 0% to about 7%.

The cellulose fibers used to provide the nonwoven web for manufacture of the fiber sheets of the invention may be provided from any fibrous, cellulose raw material such as wood, bamboo, hemp, bagasse, sisal, flax, cotton, jute and ramie. The cellulose fibers may be produced by any of the well known processes used in the manufacture of fabric or paper. Cotton is the preferred source for cellulose fiber used in the fiber sheets of the present invention in the paper industry, the separated cellulose fibers are called pulp, whether in suspension in water or dried to any degree. Cotton is the most common source for these rolls. Cellulose fibers from wood may be produced by mechanical pulping, Kraft pulping, sulphite pulping or soda pulping. The cellulose fibers useful in the invention are generally of a length of from about 0.02 to about 1.00 inches. The cellulose fibers are then subjected to shear in a beater to increase their surface area. Beating can be carried out batchwise in a Hollander beater or by use of a continuous refiner. The polyester fibers are combined with the cellulose fibers in the beater or prior to forming a nonwoven sheet of the cellulose fibers and polyester fibers.

A resin binder is not required for the fiber sheets of the invention. In some instances, however, it may be desirable to add a resin to the mixture of cellulose fibers and polyester fibers in the beater. If used, the resin is mixed with the fibers at a level of from about 0.1% and to about 3% of the fibers (dry basis).

The polyester fibers are preferably formed by the reaction of terephthalic acid and ethylene glycol. The polyester fibers produced by this reaction are known by the tradename Dacron in the United States. Polyester fibers produced by other acids and other glycols can also be used. Representative examples of acids which can be used are aromatic dicarboxylic acids such as isophthalic acid, orthophthalic acid, p,p'diphenyl dicarboxylic acid and 2,6-naphthalic acid; cycloaliphatic dicarboyxlic acids such as hexahydroterephthalic acid; and saturated aliphatic dicarboyxlic acids having from 4 to 10 carbon atoms such as succinic acid, adipic acid, sebacic acid, etc. Polyesters of other glycols can also be similarly prepared. Represented examples of such glycols are the polymethylene glycols of the series $HO(CH_2)_nOH$ where n is an integer from 2 to 10, such as ethylene glycol, propylene glycol, tetramethylene glycol, hexamethylene glycol and decamethylene glycol; the cyclohexane diols such as cyclohexane dimethanol; aromatic diols such as di-$\beta$-hydroxyethoxy benzene and 2,2-bis [4($\beta$-hydroxyethoxy)Phenyl[ propane and similar varieties of glycols. The polyester fibers useful in the present invention preferably have a length of from about 0.02 inch to about 1.0 inch.

The nonwoven web of a mixture of cellulose fibers and polyester fibers can be produced by any of the well known processes for paper manufacture. The basic principle of the large scale production of paper manufacture is to extrude a uniform continuous stream of a dilute water suspension of fibers of a specified low concentration or consistency through a long narrow slot onto an endless belt of wire screen traveling at the same speed as the stock. Most of the water drains rapidly through the screen as it moves over a series of table rolls and suction boxes which support the traveling screen and remove water from the sheet. The sheet is transferred onto an endless porous fabric blanket or felt. Supported on this felt, which absorbs water, the wet paper sheet or web passes through a series of press rolls which squeeze as much water out of the sheet as possible by mechanical pressure. The remaining water, more than half the dry weight of the sheet, is evaporated out of the paper, either by pressing alternate sides of the continuous sheet against the surface of a large number of steam-heated rolls or by impinging on the sheet a series of jets of hot air as it passes through the drier. Usually the sheet leaving the drier is passed through a calender stack or a super calender stack, pressing and smoothing the sheet and polishing the surface of the paper. The continuous web of paper is wound onto rolls.

In an important embodiment of the invention, the mixture of cellulose fibers and polyester fibers is produced by the pulping of waste fabric scrap or rags. In a particularly preferred embodiment of the invention, the rags are a fabric formed from a mixture of cellulose (cotton) fibers and polyester fibers. The polyester fiber content of the rags may be adjusted to provide the necessary level of polyester fiber required for the fiber sheets of the invention.

In the manufacture of fiber sheets from rags, the rags are packed in a horizontal cylindrical vessel known as a rotary. A solution made by boiling together a mixture of lime and soda ash is run into the rotary and the vessel is closed and steamed for eight to twelve hours at a pressure of 20 to 40 pounds. Upon completion of the cooking, the pressure is relieved and the contents of the rotary are discharged. The cooked rags are then charged into a washer, which is a machine similar to a Hollander beater used in the manufacture of paper. The washer is equipped with a washing drum, usually a hexagonal hollow device covered with wire cloth and having internal channels capable of discharging effluent wash water. Fresh water is run into the water at the same rate as the effluent is discharged and the process continues until alkali and impurities have been removed. While this washing process is going on, the rag pieces are being defibered by the action of the knives of the beater roll rubbing the rags against the knives of the bed plate. When the rags are clean and sufficiently defibered, a bleach solution may be added and when sufficiently bleached, the contents of the washer are emptied into a drainer, leaving the pulped rags in a moist state ready for use in the manufacture of fiber sheets.

The integrated nonwoven web of a randomly laid, entangled mixture of cellulose fibers and polyester fibers of the present invention is particularly adapted to producing fiber rolls in accordance with the method disclosed in U.S. Pat. No. 4,283,821 to Paakkunainen. In that patent, it is disclosed that annular fiber sheets may, due to the great axial compression involved, be deformed so that a cavity is formed between the fiber material and the shaft portion of the roll. Such a cavity is harmful for the function of the fiber roll. In accordance with the method of the Paakkunainen patent, a hardening substance is supplied with suitable pressure through a supply duct to fill possible cavities between the shaft portion and the cover portion formed by the plurality of annular fiber sheets. By this means a strong and durable roll is obtained in which there are no harmful internal cavities.

The following example further illustrates various features of the invention but is in no way intended to limit the scope of the invention which is defined in the appended claims.

EXAMPLE

A bale of polyester and cotton garment scrap was analyzed for polyester content. 1000 pounds of polyester/cotton scrap was found to be 65% polyester. 300 pounds of all cotton garment scrap was added to adjust the polyester content to 50%.

This mixture of rags was cut in a commercial rag cutter until the pieces were less than 1 inch longest dimension. The cut rags were transferred to a Hollander beater where the pieces of cut fabric were defibered. During this process the fibers were shortened, and the cotton fibers were fibrillated. At the same time the fibrous mass was washed. After the fibers were sufficiently beaten, 1% by weight (dry basis) of polyamide epichlorohydrin copolymer resin was added for a binder.

The water slurry of mixed fibers was pumped to a paper machine where the slurry was distributed over a continuously moving wire screen. After allowing water to drain by gravity, the wire screen passed over several vacuum boxes which removed additional water. The last step on the paper machine was a series of press rolls (wringer rolls) which removed any remaining free water and densified the fibrous mass.

At this stage the fibers were formed into a continuous non-woven web containing approximately 60% water. To remove this water the web was passed through a hot air dryer which blows heated air onto both sides of the web.

After drying, the non-woven web was die cut into 17¾ inch by 8 inch annular sheets for fabrication into a calender roll by the process described in U.S. Pat. No. 4,283,821 (Paakkunainen). 450 pounds of the annular sheets were used to provide a roll having a length of 52 inches after compression in a hydraulic press.

What is claimed is:

1. In an elastic roll comprising a shaft having an axis and a plurality of annular fiber sheets, where the sheets are stacked on the shaft and axially compressed to form the roll, the improvement comprising forming said fiber sheets from a non-woven web prepared from a mixture of cellulose fibers and polyester fibers, said fiber sheets comprising less than about 3% by weight of a resin, based on the dry weight of the fibers.

2. A roll in accordance with claim 1 wherein said polyester fibers comprise from about 20% to about 75% by weight, dry basis, of said fiber sheets.

3. A roll in accordance with claim 1 wherein said cellulose fibers are provided from a cellulose source selected from the group consisting of wood, bamboo, hemp, bagasse, sisal, flax, cotton, jute and ramie.

4. A roll in accordance with claim 1 wherein said polyester fiber is formed from the reaction of terephthalic acid and ethylene glycol.

5. A roll in accordance with claim 1 wherein said cellulose fibers and said polyester fibers are provided from rags.

6. A roll in accordance with claim 3 wherein said polyester fibers comprise from about 20% to about 75% by weight, dry basis, of said fiber sheets.

7. A roll in accordance with claim 3 wherein said cellulose fibers are cotton.

8. A roll in accordance with claim 7 wherein said polyester fibers comprise from about 40% to about 60% by weight, dry basis, of said fiber sheets.

9. A roll in accordance with claim 1 wherein said cellulose fibers and said polyester fibers have a length of from about 0.02 to about 1.0 inch.

10. A roll in accordance with claim 1 wherein said fiber sheets further comprise a resin at a level of from about 0.1% to about 3% by weight, based on the dry weight of the fibers.

* * * * *

UNITED STATES PATENT AND TRADEMARK OFFICE
CERTIFICATE OF CORRECTION

PATENT NO. : 5,038,448

DATED : August 13, 1991

INVENTOR(S) : John H. Gusmer

It is certified that error appears in the above-identified patent and that said Letters Patent is hereby corrected as shown below:

On title page, item [56], References Cited, U.S. PATENT DOCUMENTS

"843,700 2/1990 Rusden" should read --843,700 2/1907 Rusden--. and

"4,669,163 7/1987 Lux et al." should read --4,669,163 6/1987 Lux et al--.

Column 1, line 34, after "roll" delete "is" and substitute therefor --in--.

Column 3, line 39, delete "dicarboyxlic" and substitute therefor --dicarboxylic--.

Column 3, line 49, delete "Phenyl[" and substitute therefor --Phenyl]--.

Column 4, line 33, after "into the", delete "water" and substitute therefor --washer--.

Signed and Sealed this

Third Day of August, 1993

*Attest:*

MICHAEL K. KIRK

*Attesting Officer*     *Acting Commissioner of Patents and Trademarks*